(12) United States Patent
Batur et al.

(10) Patent No.: US 11,707,999 B2
(45) Date of Patent: Jul. 25, 2023

(54) CAMERA BASED AUTO DRIVE AUTO CHARGE

(71) Applicant: Faraday & Future Inc., Gardena, CA (US)

(72) Inventors: Aziz Umit Batur, Torrance, CA (US); Oliver Max Jeromin, Torrance, CA (US); Paul Alan Theodosis, Rancho Palos Verdes, CA (US); Michael Venegas, Placentia, CA (US)

(73) Assignee: Faraday & Future Inc., Gardena, CA (US)

( * ) Notice: Subject to any disclaimer, the term of this patent is extended or adjusted under 35 U.S.C. 154(b) by 21 days.

(21) Appl. No.: 17/463,925

(22) Filed: Sep. 1, 2021

(65) Prior Publication Data

US 2021/0402924 A1    Dec. 30, 2021

Related U.S. Application Data

(63) Continuation of application No. 16/090,227, filed as application No. PCT/US2017/025081 on Mar. 30, 2017, now Pat. No. 11,117,517.

(Continued)

(51) Int. Cl.
*B60L 53/37* (2019.01)
*B60T 7/22* (2006.01)
(Continued)

(52) U.S. Cl.
CPC .............. *B60L 53/37* (2019.02); *B60Q 9/005* (2013.01); *B60T 7/22* (2013.01); *G06T 7/74* (2017.01);
(Continued)

(58) Field of Classification Search
CPC .. B60N 2/5657; B60N 2/5635; B60N 2/5678; B60N 2/002; B60N 2/5685; B60H 1/00285; B60H 2001/003
(Continued)

(56) References Cited

U.S. PATENT DOCUMENTS 6,483,429 B1 * 11/2002 Yasui .................. G06V 20/586
348/148
2011/0140658 A1 * 6/2011 Outwater ................ B60L 53/35
320/109
(Continued)

FOREIGN PATENT DOCUMENTS

| JP | 2012209882 A | 10/2012 |
| KR | 20160011789 A | 2/2016 |
| KR | 1020160018637 A | 2/2016 |

OTHER PUBLICATIONS

International Search Report dated Aug. 4, 2017 for International Application No. PCT/US2017/025081.

*Primary Examiner* — Muhammad Shafi
(74) *Attorney, Agent, or Firm* — Veros Legal Solutions, LLP (57) ABSTRACT

A vehicle control system for moving a vehicle to a target location is disclosed. According to examples of the disclosure, a camera captures one or more images of a known object corresponding to the target location. An on-board computer having stored thereon information about the known object can process the one or more images to determine vehicle location with respect to the known object. The system can use the vehicle's determined location and a feedback controller to move the vehicle to the target location.

16 Claims, 10 Drawing Sheets

Related U.S. Application Data (60) Provisional application No. 62/316,370, filed on Mar. 31, 2016.

(51) Int. Cl.
| | |
|---|---|
| *G06V 10/44* | (2022.01) |
| *G06V 20/56* | (2022.01) |
| *G06V 20/58* | (2022.01) |
| *G06T 7/73* | (2017.01) |
| *B60Q 9/00* | (2006.01) |

(52) U.S. Cl.
CPC .............. *G06V 10/44* (2022.01); *G06V 20/56* (2022.01); *G06V 20/586* (2022.01); *B60L 2240/62* (2013.01); *B60L 2260/32* (2013.01); *B60R 2300/301* (2013.01); *B60T 2201/022* (2013.01); *B60T 2201/10* (2013.01); *G06T 2207/30248* (2013.01); *G06T 2207/30264* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01)

(58) Field of Classification Search
USPC .......................................................... 701/28
See application file for complete search history.

(56) References Cited

U.S. PATENT DOCUMENTS

| | | | |
|---|---|---|---|
| 2011/0213656 A1* | 9/2011 | Turner .................. | G06Q 30/00 320/109 |
| 2014/0058656 A1 | 2/2014 | Chen | |
| 2014/0089016 A1* | 3/2014 | Smullin ................. | G06Q 10/02 705/5 |
| 2015/0206015 A1 | 7/2015 | Ramalingam et al. | |
| 2016/0046194 A1* | 2/2016 | Tsukamoto ............ | B60L 53/65 307/104 |
| 2016/0297312 A1* | 10/2016 | Tsukamoto ............ | B60L 53/36 |
| 2017/0008409 A1* | 1/2017 | Roberts ................. | B60L 53/665 |

\* cited by examiner

CAMERA BASED AUTO DRIVE AUTO CHARGE

CROSS REFERENCE TO RELATED APPLICATIONS

The present application claims the benefit of U.S. Provisional Application No. 62/316,370, filed Mar. 31, 2016 and U.S. patent application Ser. No. 16/090,227, filed Mar. 30, 2017, the entirety of which is hereby incorporated by reference.

FIELD OF THE DISCLOSURE

This relates to a vehicle, and more particularly, to a vehicle capable of determining its location with respect to a marker having a known characteristic (e.g., shape, size, pattern, position, etc.).

BACKGROUND OF THE DISCLOSURE

On-board cameras have become increasingly common in consumer automobiles. Typically, these cameras are mounted to the back of a vehicle so the driver can conveniently monitor the space behind the vehicle when driving in reverse, though some vehicles may include forward-facing cameras as well. Because the sizes of the objects behind the vehicle can be unknown to the vehicle's on-board computer, these "backup cameras" can be incapable of determining the distance and/or orientation of the vehicle with respect to objects proximate to the vehicle. In order to detect vehicle distance, position, and/or orientation relative to proximate objects, additional sensors can be used. Consumer automobiles can feature radar or ultrasonic sensors for distance sensing purposes. These sensors can determine the distance between the vehicle and a proximate object, but may have difficulty performing when the object is too close to the sensor. As a result, this technology can be impractical for close-range distance measurements. Furthermore, these techniques may have difficulty determining the vehicle's orientation relative to proximate objects.

Close-range distance measurements and high-accuracy orientation measurements can be critical in automated vehicle technology. High accuracy positional measurements can be required to precisely maneuver an automated vehicle into a small space, or to park the vehicle, for example. As the vehicle moves within a small space, the ability to detect objects close to the vehicle can become more important. Because radar and ultrasonic sensors may not be able to measure short distances, these technologies may not be suitable when the vehicle is in a small space. Advanced sensor technology, such as LiDAR, may be able to perform at a range of distances with high accuracy, but are seldom incorporated into consumer automobiles, primarily due to cost. Therefore, there exists a need in the field of consumer automobiles to accurately measure the distance and/or orientation of a vehicle with respect to proximate objects to facilitate automated vehicle control and/or movement, such as automated parking.

SUMMARY OF THE DISCLOSURE

This relates to a vehicle control system capable of determining vehicle location (e.g., distance, orientation, etc.) with respect to a marker having a known characteristic (e.g., shape, size, pattern, position, etc.). In some examples, the marker can include a cylindrical portion with two distinct sides. According to some examples of the disclosure, the vehicle control system includes one or more cameras, an on-board computer, and a vehicle controller. When a camera captures an image of a known, or partially known, marker, an on-board computer can use the image and known information about the marker and the camera's position on a vehicle to determine the vehicle's location with respect to the marker. By using a known, or partially known, marker as a reference, vehicle location can be determined from a single image captured by a single camera in some examples, rather than requiring multiple images and/or multiple cameras. According to some examples, the marker can include a cylindrical portion with two or more visually distinct regions. The one or more edges between the regions and/or the edges of the cylindrical portion itself can appear in a captured image and be used by the on-board computer to determine vehicle location. With this information, the vehicle controller can, for example, move the vehicle to a desired location with respect to the known marker automatically. In some examples, the vehicle may be an electric automobile and the desired location may correspond to a battery recharging station. The recharging station may be located in a public place such as a parking lot or garage or in a vehicle owner's private garage, for example. When the vehicle moves to the recharging station, charging can begin automatically via a charging interface of the charger so that a driver does not need to manually connect the charger and begin charging the vehicle.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

This relates to a vehicle control system capable of determining vehicle location (e.g., distance, orientation, etc.) with respect to a marker having a known characteristic (e.g., shape, size, pattern, position, etc.). According to some examples of the disclosure, the vehicle control system includes one or more cameras, an on-board computer, and a vehicle controller. When a camera captures an image of a known, or partially known, marker, an on-board computer can use the image, the known information about the marker, and the camera's position on a vehicle to determine the vehicle's location with respect to the marker. By using a known, or partially known, marker as a reference, vehicle location can be determined from a single image captured by a single camera in some examples, rather than requiring multiple images and/or multiple cameras. According to some examples, the marker can include a cylindrical portion with two or more visually distinct regions. The one or more edges between the regions and/or the edges of the cylindrical portion itself can appear in a captured image and be used by the on-board computer to determine vehicle location. With this information, the vehicle controller can, for example, move the vehicle to a desired location with respect to the known marker automatically. In some examples, the vehicle may be an electric automobile and the desired location may correspond to a battery recharging station. The recharging station may be located in a public place such as a parking lot or garage or in a vehicle owner's private garage, for example. When the vehicle moves to the recharging station, charging can begin automatically via a charging interface of the charger so that a driver does not need to manually connect the charger and begin charging the vehicle.

Figure 1:
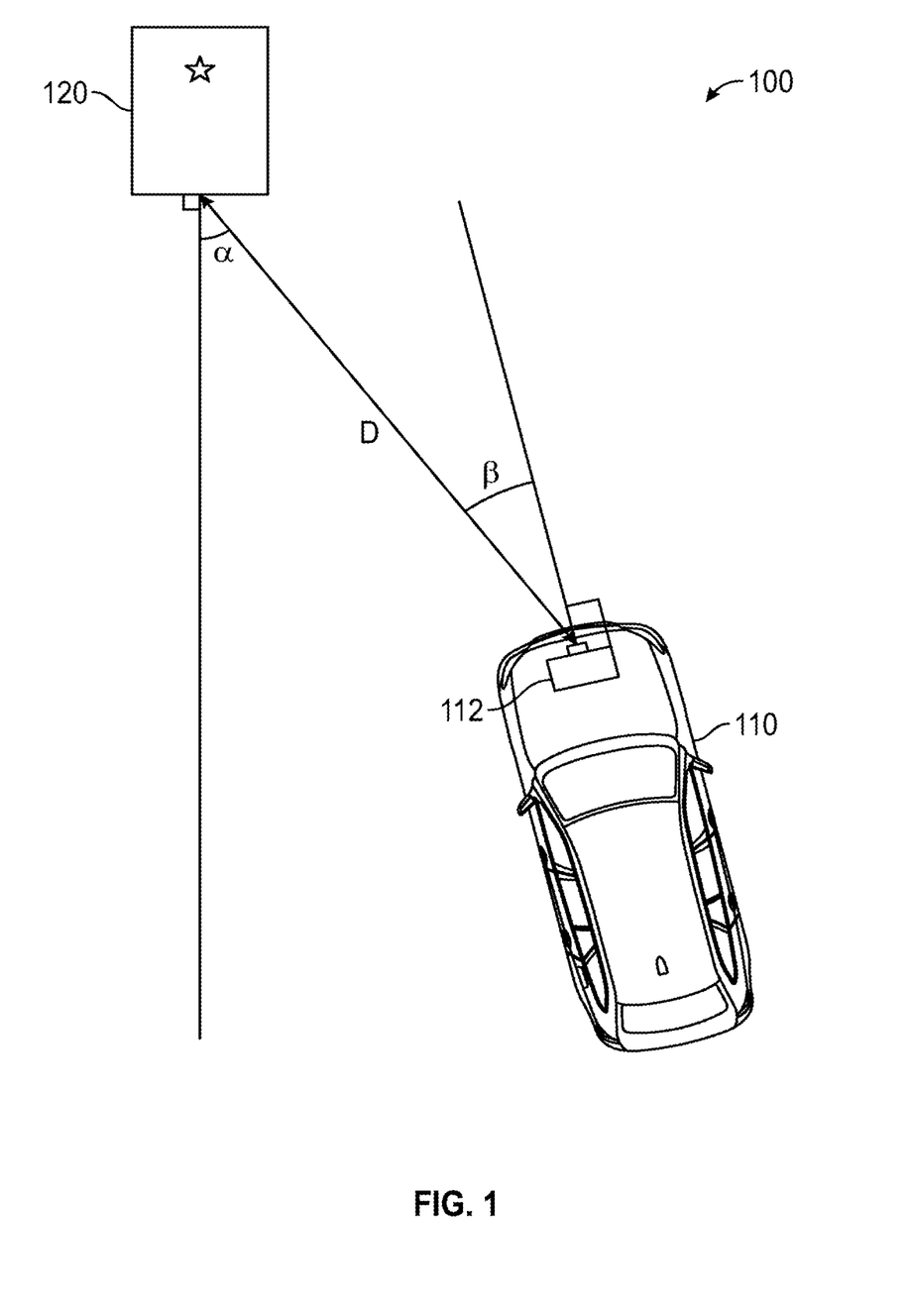
FIG. 1 illustrates an exemplary vehicle outfitted with a camera capturing an image of a known object and determining the vehicle's distance, position, and orientation relative to the known object according to examples of the disclosure.

On-board cameras have become increasingly common in consumer automobiles. Typically, these cameras are mounted to the back of a vehicle so that the driver can conveniently monitor the space behind the vehicle when driving in reverse. Similarly, a camera mounted to the front of a vehicle can be used to monitor the front of the vehicle and, in conjunction with a vehicle control system, can determine vehicle position to assist in driverless maneuvering. FIG. 1 illustrates an exemplary vehicle 110 outfitted with a camera 112 (e.g., mounted to the front of the vehicle) capturing an image of a known object 120 and determining the vehicle's distance, position, and orientation relative to the known object 120 according to examples of the disclosure. In some examples of the disclosure, the known object 120 may be an electronic automobile recharging station. The vehicle 110 can be situated at a distance D from the known object 120 with a lateral position expressed by angle $\alpha$ (e.g., with respect to a portion of the object, such as the front of the object) and a heading angle $\beta$ (e.g., with respect to a portion of the vehicle, such as the front of the vehicle). The distance D can be the shortest path between the camera 112 and the known object 120. The lateral position can be expressed by the angle $\alpha$ formed between the distance D (between the object 120 and the vehicle 110) and a normal surface of the known object 120. The heading angle $\beta$ can be formed between distance D (between the object 120 and the vehicle 110) and a normal surface of the camera 112. The camera 112 can capture an image of the known object 120 to allow an onboard computer incorporated into vehicle 110 to determine distance D and angles $\alpha$ and $\beta$ with high accuracy. A control system of the vehicle 110 can use these values to automatically maneuver the vehicle 110 to a desired location having a distance, a lateral position, and a heading associated therewith, such as navigating the vehicle such that each of D, $\alpha$ and $\beta$ are substantially zero (i.e., the vehicle is parked in front of the known object 120, directly facing and aligned with the known object). The vehicle can include an onboard computer with the location, position, and orientation of the camera relative to the vehicle stored thereon, allowing the controller to determine the vehicle's location, position, and orientation based on the determined location of the camera. The desired location can be, for example, a position proximate to an electronic vehicle recharging station such that an electronic automobile can begin recharging automatically.

Figure 2:
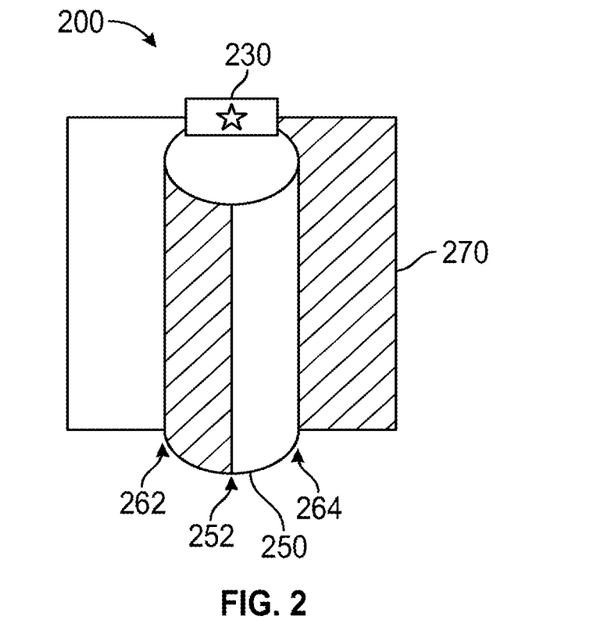
FIG. 2 illustrates an exemplary known object featuring a visual indicator, a cylindrical portion, and a vertical plane according to examples of the disclosure.

To allow a vehicle to determine its location, position, and orientation relative to a known object with high precision, the object can have visual features designed for easy detection and characterization. By using a known, or partially known, marker as a reference, vehicle location can be determined from a single image captured by a single camera in some examples, rather than requiring multiple images and/or multiple cameras. FIG. 2 illustrates an exemplary known object 200 featuring a visual indicator 230, a cylindrical portion 250, and a vertical plane 270 according to examples of the disclosure. The visual indicator 230 can have a unique visual characteristic such as a pattern, design, or logo that can be detected by an image processing algorithm performed on a vehicle, for example. By locating the visual indicator 230, the image processing algorithm can locate the known object 200 in an image captured by a camera on the vehicle. In some examples, known object 200 may not include visual indicator 230, and the image processing algorithm on a vehicle can, instead, locate the known object using other features of the known object (e.g., the other features of the known object described below). The known object 200 can also have a cylindrical portion 250 disposed in front of a vertical plane 270. Cylindrical portion 250 can be cylindrical, or substantially cylindrical or have other suitable geometry, such that viewing the cylindrical portion from different lateral angles can smoothly and/or predictably vary the horizontal dimensions of the visible regions of the cylindrical portion (for reasons that will be described in more detail below). The cylindrical portion 250 can have two regions, each with a different visual characteristic, such as being black and white, respectively, as illustrated in FIG. 2. For example, the two regions can have different colors, patterns, reflectivity, or luminosities. The visual characteristics of the two regions of the cylindrical portion can make the vertical center 252 of the cylinder 250 easier to detect using an image processing algorithm. The vertical center 252 can be parallel to the left edge 262 and right edge 264 as shown in FIG. 2, for example. In some examples, a vertical center can be slanted with respect to left edge 262 and right edge 264, so that a portion of each of the left and right regions can be visible from a wider range of angles around the cylinder. The vertical plane 270 can also have two regions with different visual characteristics that make the right edge 264 and the left edge 262 of the cylindrical portion 250 easier to detect. For example in FIG. 2, left edge 262 of cylindrical portion 250 can be situated in front of a region of vertical plane 270 having a visual characteristic that contrasts the visual characteristic of the left portion of the cylindrical portion 250. Left edge 262 can thus be formed between a light-colored portion of the vertical plane 270 and a dark-colored portion of the cylindrical portion 250, for example, making it easier for the image processing algorithm to determine where the left edge 262 is located. In some examples, known object 200 can be placed in a visually busy environment, such as in a parking lot or proximate to buildings, mailboxes, and other objects, for example. In visually busy environments, vertical plane 270 can make the left edge 262 and the right edge 264 easier to detect using an image processing algorithm, for example. In some examples, known object 200 can be placed in a visually sparse environment, such as a parking garage, against a wall, or proximate to other large, monochromatic objects, for example. In such environments, left edge 262 and right edge 264 can have sufficient contrast with respect to the background of known object 200 without the need for vertical plane 270. Accordingly, in some examples of the disclosure, vertical plane 270 may be omitted. The center 252 of the cylindrical portion 250, the right edge 264, and the left edge 262 can form three visual features of a captured image of object 200 that can be located by an image processing algorithm to determine a vehicle's distance, position, and orientation relative to known object 200, as will be discussed in more detail below. In some examples, the cylindrical portion may have more than two visually distinct regions, forming more than three edges recognizable by the image processing algorithm, which can be utilized in manners analogous to those described in this disclosure to determine vehicle location. Additionally or alternatively, in some examples, a visual feature can be any identifiable part of the object.

Figure 3:
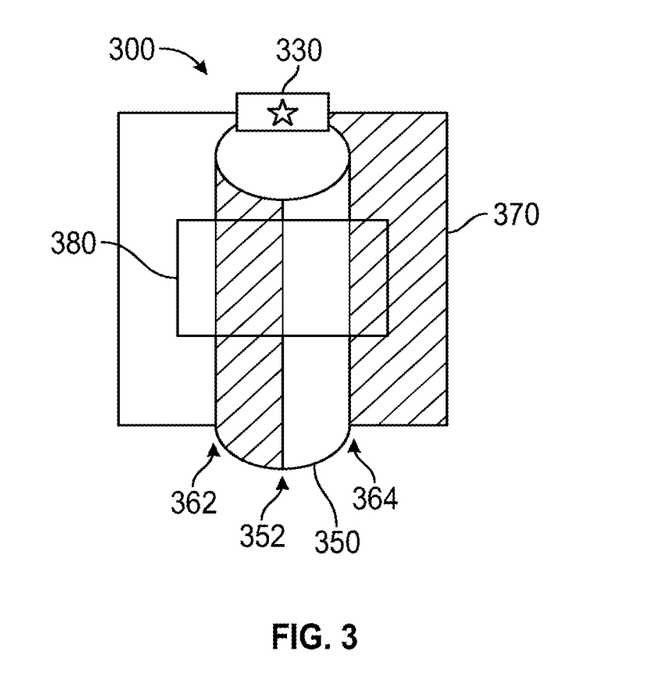
FIG. 3 illustrates a cropped window including an image of a cylindrical portion of a known object according to examples of the disclosure.

The visual indicator of FIG. 2 can be detected in an image captured by a vehicle's onboard camera to locate the cylindrical portion of the known object of FIG. 2, as will now be described. FIG. 3 illustrates a cropped window 380 of an image captured by a vehicle's onboard camera, including an image of a cylindrical portion 350 of a known object 300. By detecting a visual indicator 330 first, an image processing algorithm can ensure that a cropped window 380 includes part of a cylindrical portion 350 and a vertical plane 370 of a known object 300, rather than a similar-looking, unrelated object. For example, the image processing algorithm can identify visual indicator 330, and can then define cropped window 380 as being offset from the visual indicator by a certain predefined amount based on an apparent size of the visual indicator 330 in a captured image of a known object 300. In some examples, a desired location for a cropped window 380 may be centered with, and below the visual indicator 330 by some distance. Because in some examples, the image processing algorithm can have information about the location of visual indicator 330 with respect to cylindrical portion 350 of known object 300, the above-described offset distance can be known. The cropped window 380 can capture an image of known object 300 including left edge 362, center 352, and right edge 364 of the cylindrical portion 350 of the known object 300. The edges can appear, in a cropped window 380, as visual features that can be identified by any suitable image processing technique. The image processing algorithm can locate the visual features (e.g., edges and center) in cropped window 380 using any suitable image processing technique. For example, to locate the visual features, an image processing algorithm can calculate a vertical projection of the image included in the cropped window 380. If the cylindrical portion 350 has two halves defined by different colors, for example (e.g., black and white), a vertical projection can be an average color for all pixels in each column of pixels in the image within cropped window 380. Other characteristics such as reflectivity and luminosity can be used in addition or as an alternative to color. Once a vertical projection has been obtained, a derivative can be calculated to indicate a change in the projection between adjacent columns for each column. Local minima and maxima of the derivative of the vertical projection can indicate a rapid change in color or other visual characteristic associated with the different halves of the cylindrical portion 350 and the vertical plane 370 of the known object 300. In some examples, an absolute location of each visual feature (e.g. edge) can be located—that is, the location can be resolved to an exact pixel or plurality of pixels representing each visual feature. The local minima and maxima can correspond to the locations of each of the left edge 362, center edge 352, and right edge 364, for example. Once the three edges are identified, the distance, position, and/or orientation of a vehicle relative to the known object (e.g., the cylindrical portion 350 of known object 300) can be calculated, as will be described below.

Figure 4A:
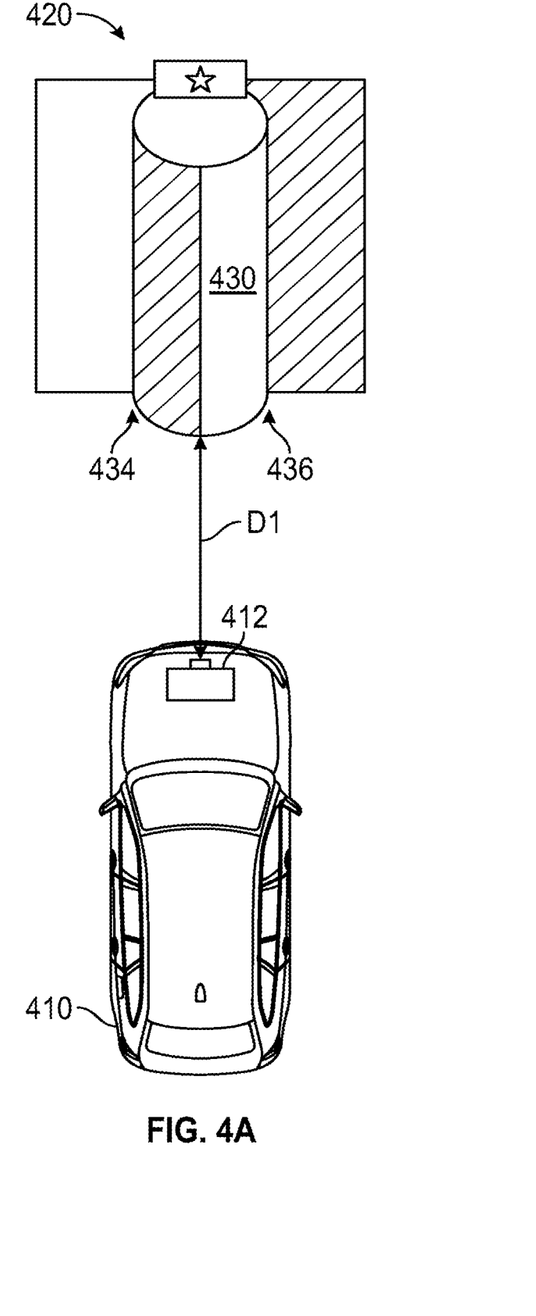
FIGS. 4A-4D illustrate a vehicle outfitted with a camera capturing images of a known object and determining the vehicle's distance from the known object according to examples of the disclosure.
Figure 4B:
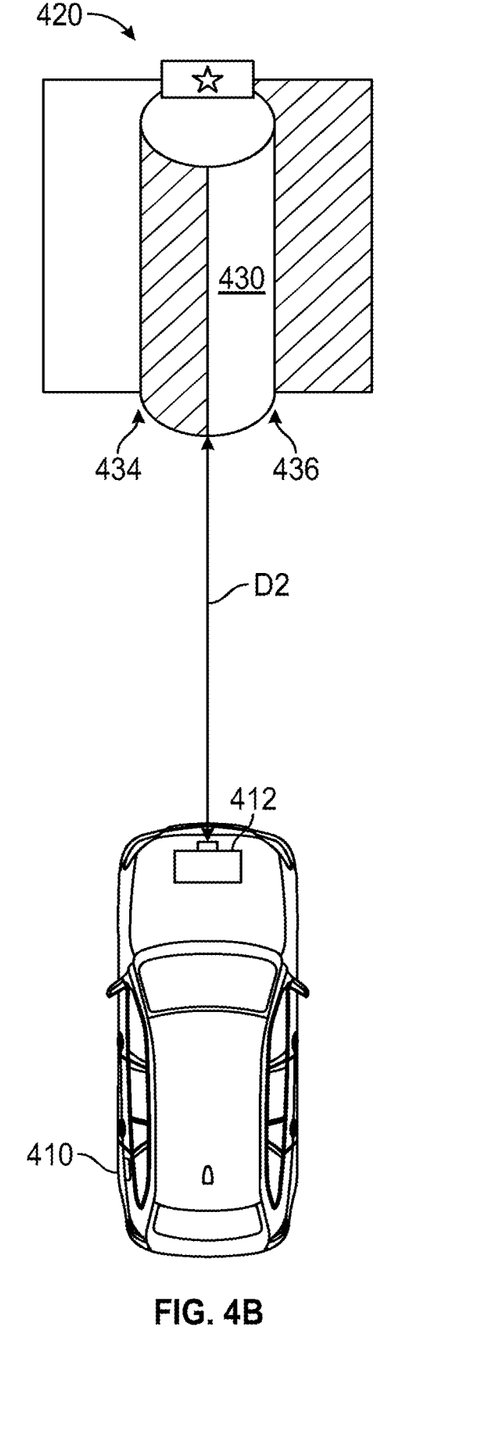
Figure 4C:
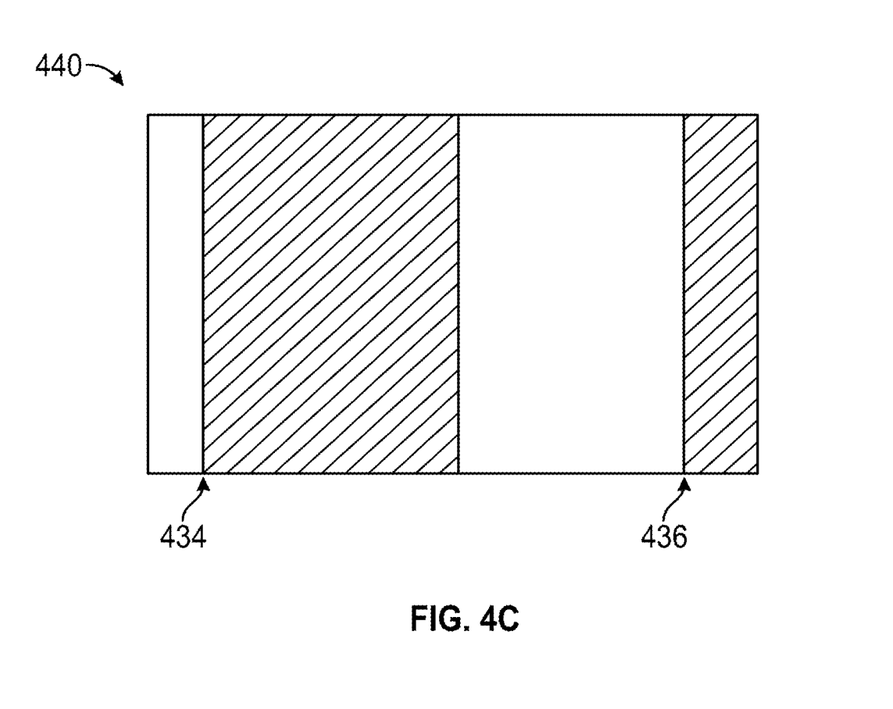
Figure 4D:
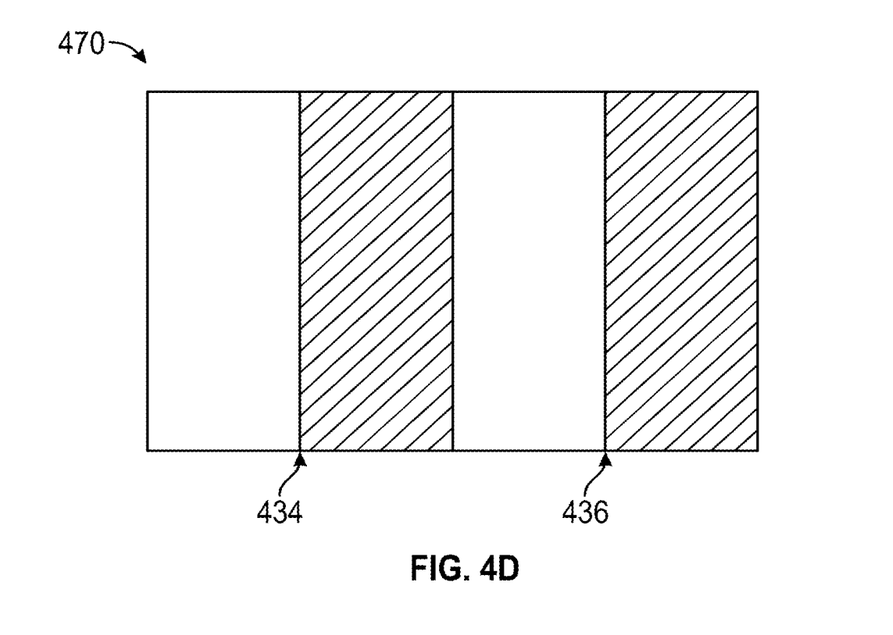

As previously stated, a vehicle outfitted with a camera and an onboard computer can capture an image of a known object to determine the vehicle's distance from the object based on the location of a plurality of visual features of the object within the captured image. FIGS. 4A-4D illustrate a vehicle 410 outfitted with a camera 412 capturing images 440 and 470 of a known object 420 and determining the distance between the vehicle 410 and the known object 420 according to examples of the disclosure. In FIG. 4A, the vehicle 410 can be positioned a distance D1 from the known object 420. The camera 412 can capture image 440 depicted in FIG. 4C of the cylindrical portion 430 of the known object 420. In FIG. 4B, the vehicle 410 can be positioned a distance D2 from the known object 420. The camera 412 can capture image 470 depicted in FIG. 4D of the cylindrical portion 430 of the known object 420. Images 440 and 470 can correspond to the image within cropped window 380 discussed with respect to FIG. 3. Because D1 can be a shorter distance than D2, the cylindrical portion 430 can appear larger in image 440 than it appears in image 470. An image processing algorithm can detect this difference in size by determining where the left edge 434 and the right edge 436 of the cylindrical portion 430 of the known object 420 fall within a captured image, in addition or alternatively to determining where the center edge of the cylindrical portion is located within the captured image (e.g., determining the distance(s) between the left, center and/or right edges in the image). For example, in image 440, left edge 434 and right edge 436 are further apart than left edge 434 and right edge 436 in image 470, thus indicating that vehicle 410 in FIG. 4A is closer to the known object 420 than is the vehicle in FIG. 4B. In order to determine an absolute distance of vehicle 410 from known object 420, an image processing algorithm can compare the size of the cylindrical portion 430 in the captured image to a calibration size. The calibration size can be associated with an image captured when the vehicle is parked in a desired location, such as in front of known object 420, for example. In some examples, the desired location can be proximate to an electric vehicle recharging station such that the vehicle can recharge automatically when it is parked in the desired location. The amount by which the size of the cylindrical portion 430 in the captured image differs from the calibration size can be mapped to an absolute distance (e.g., via a lookup table or other predetermined relationship between cylindrical size and distance) to determine the distance at which the vehicle located with respect to known object 420. The vehicle's distance error can be a difference between a determined distance and a calibration distance.

Figure 5A:
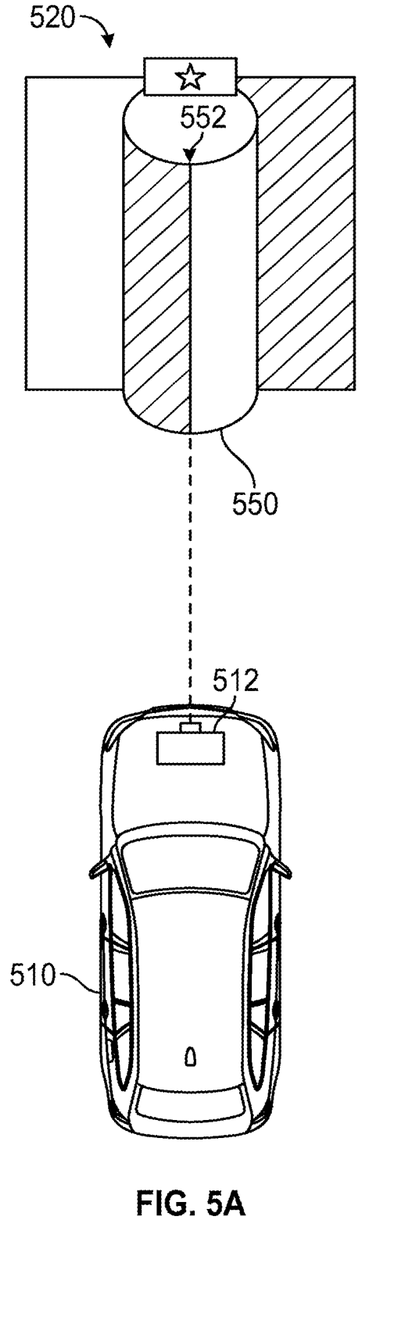
FIGS. 5A-5D illustrate a vehicle outfitted with a camera capturing images of a known object and determining the heading of the vehicle relative to the known object according to examples of the disclosure.
Figure 5B:
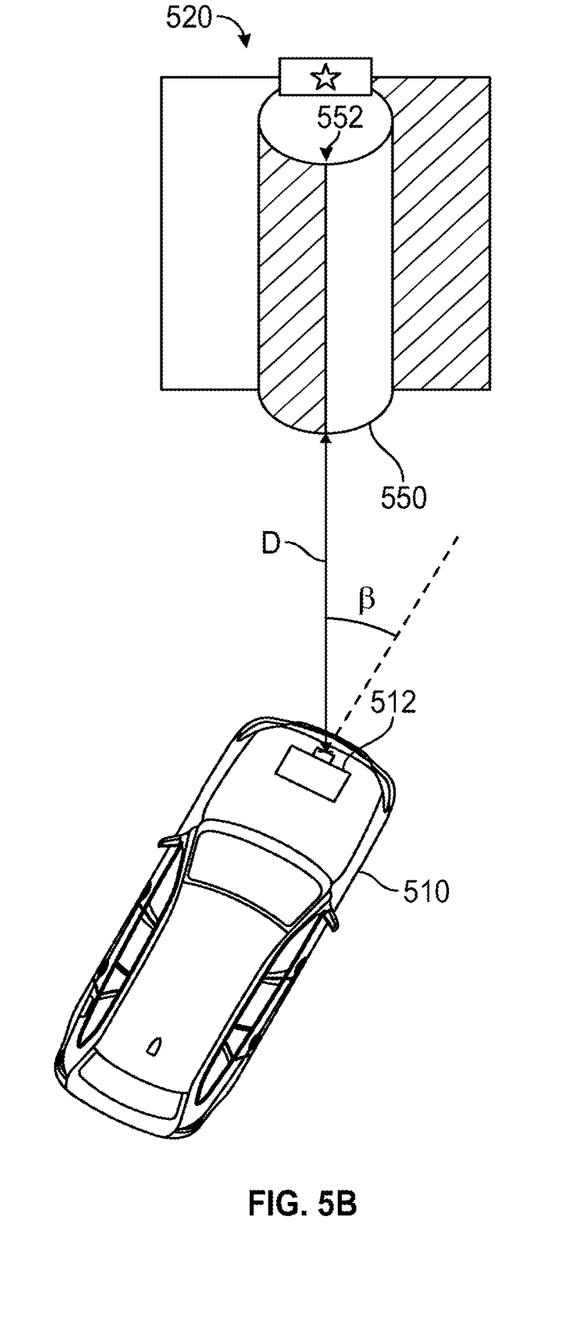
Figure 5C:
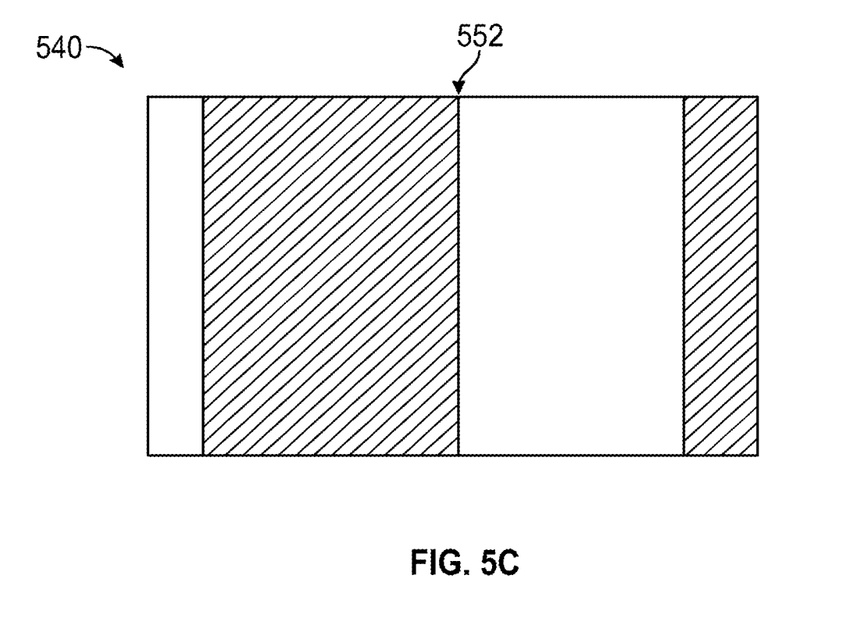
Figure 5D:
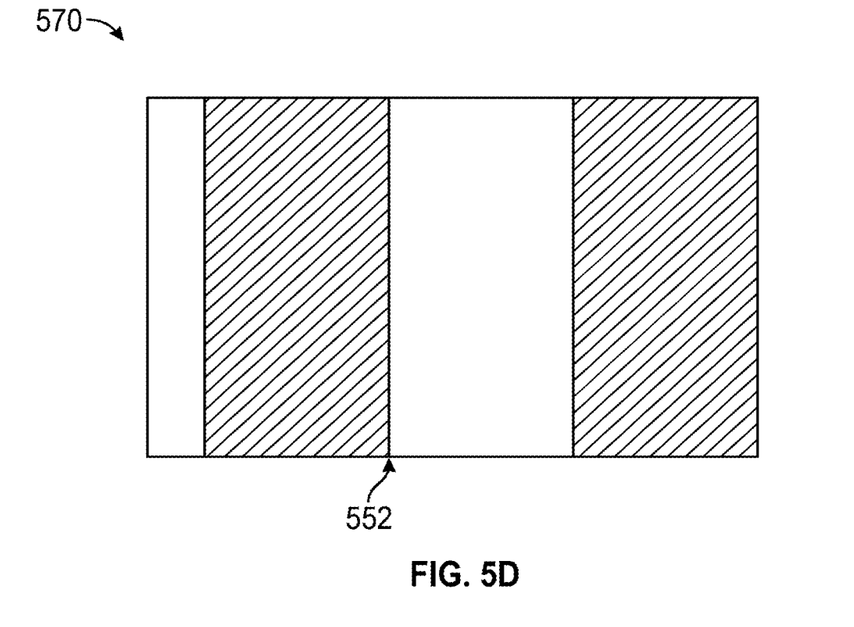

As previously stated, a vehicle outfitted with a camera and an onboard computer can capture an image of a known object to determine a vehicle's heading angle relative to the object based on the location of a plurality of visual features (e.g., edges) of the object within the captured image, as will be described below. FIGS. 5A-5D illustrate vehicle 510 outfitted with a camera 512 capturing images 540 and 570 of a known object 520 and determining the heading of the vehicle 510 relative to the known object 520 according to examples of the disclosure. In some examples, heading angle β can be formed between distance D (between the object 520 and the vehicle 510) and a normal surface of the camera 512. Heading angle β can quantify a direction vehicle 510 is pointed, relative to known object 520, for example. In FIG. 5A, the vehicle 510 can face the known object 520 directly. The camera 512 can capture image 540 depicted in FIG. 5C of the cylindrical portion 550 of the known object 520. In FIG. 5B, the vehicle 510 can be positioned at a heading angle of β relative to the known object 520. Camera 512 can capture image 570 depicted in FIG. 5D of the cylindrical portion 550 of the known object 520. Images 540 and 570 can correspond to the image within cropped window 380 discussed with respect to FIG. 3. Because of the heading angle β in FIG. 5B, the location of a center edge 552 of cylindrical portion 550 can be further to the left in image 570 than it appears in image 540. An image processing algorithm can detect the relative location of center edge 552 within the image to determine vehicle heading angle, in addition or alternatively to determining where the left and right edge of the cylindrical portion is located within the captured image (e.g. determining the distance(s) between the left, center and/or right edges in the image). For example, in image 540, center edge 552 is closer to the center of the image 540 than center edge 552 in image 570, thus indicating that vehicle 510 in FIG. 5A has a smaller (or negligible, for example) heading angle than the heading angle β of the vehicle 510 shown in FIG. 5B. In order to determine an absolute heading angle of vehicle 510 with respect to known object 520, an image processing algorithm can compare the position of center edge 552 in the captured image to a calibration position of a center edge, for example. The calibration position of a center edge can be associated with an image captured when the vehicle is parked in a desired location, such as in front of known object 520, for example. In some examples, the desired location can be proximate to an electric vehicle recharging station such that the vehicle can recharge automatically when it is parked in the desired location. The amount by which the position of center edge 552 in the captured image differs from the calibration position can be mapped to an absolute heading angle (e.g. via a lookup table or other predetermined relationship between center edge position and heading angle) to determine the heading angle of the vehicle 510 with respect to known object 520. The vehicle's heading error can be a difference between a determined heading angle and a calibration heading angle associated with the calibration center edge position.

Figure 6A:
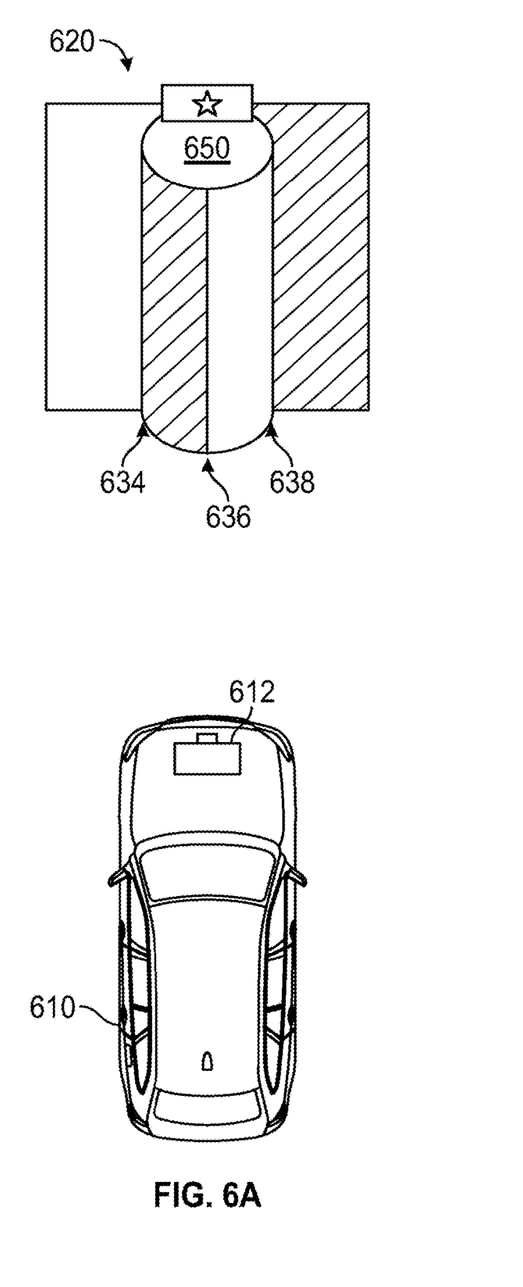
FIGS. 6A-6D illustrate vehicle outfitted with a camera capturing images of a known object and determining the lateral angle of the vehicle relative to the known object according to examples of the disclosure
Figure 6B:
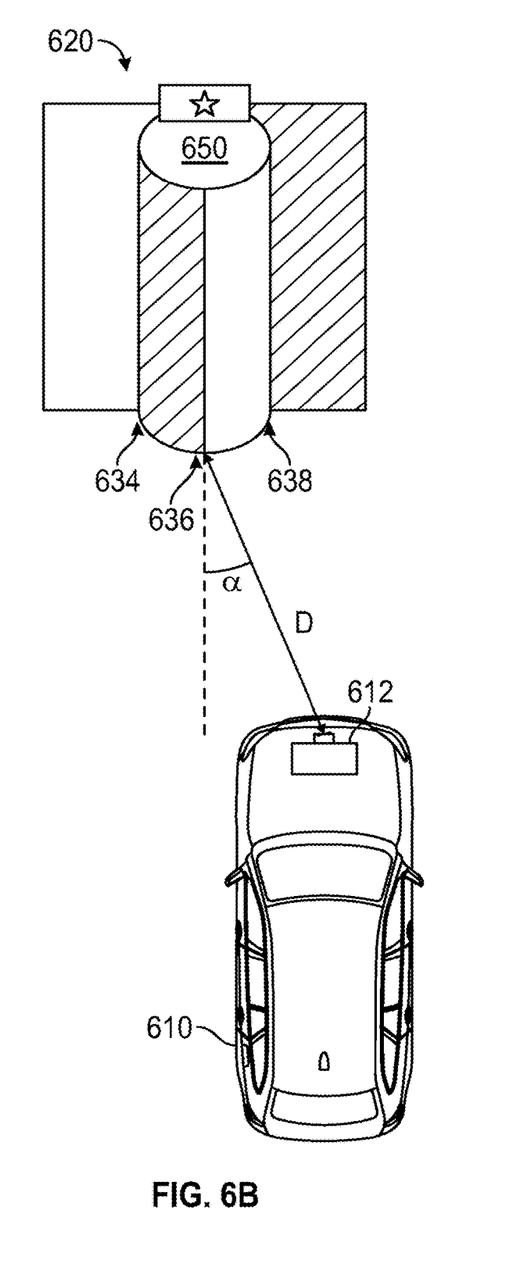
Figure 6C:
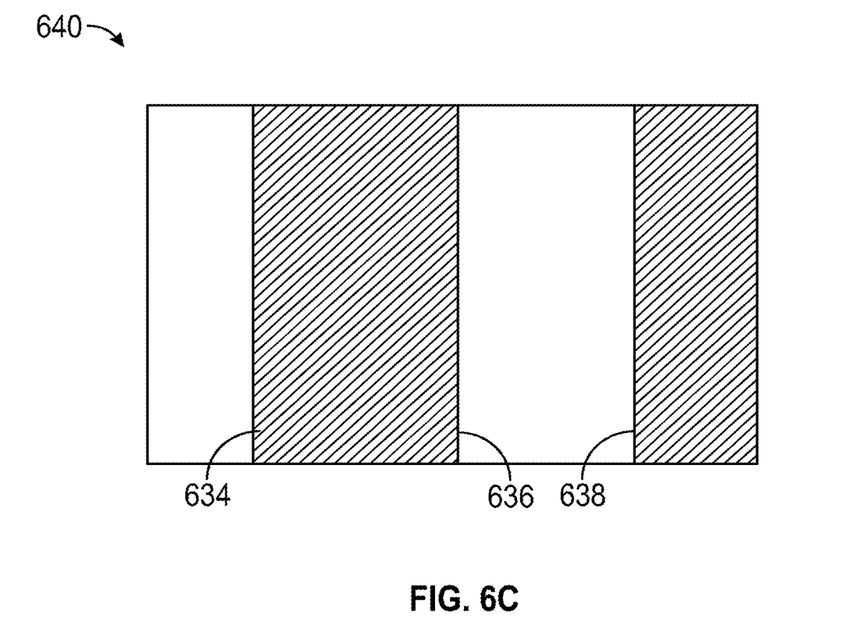
Figure 6D:
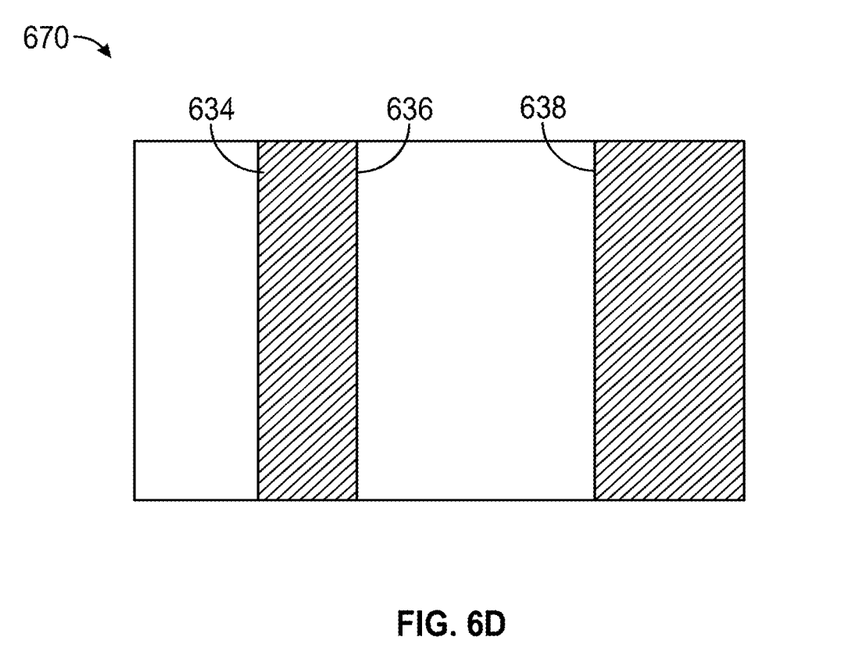

As previously stated, a vehicle outfitted with a camera and an onboard computer can capture an image of a known object to determine the vehicle's lateral angle relative to the object based on the location of a plurality of visual features (e.g., edges) of the object within the captured image, as will be described below. FIGS. 6A-6D illustrate vehicle 610 outfitted with a camera 612 capturing images 640 and 670 of a known object 620 and determining the lateral angle of the vehicle 610 relative to the known object 620 according to examples of the disclosure. In some examples, lateral angle α formed between distance D (between the object 620 and the vehicle 610) and a normal surface of the known object 620. Lateral angle α can quantify a horizontal position of vehicle 610 relative to known object 620, for example. In FIG. 6A, the vehicle 610 can be centered relative to known object 620. The camera 612 can capture image 640 depicted in FIG. 6C of the cylindrical portion 650 of the known object 620. In FIG. 6B, the vehicle 610 can be positioned at a lateral angle of a relative to the known object 620. Camera 612 can capture image 670 depicted in FIG. 6D of the cylindrical portion 650 of the known object 620. Images 640 and 670 can correspond to the image within cropped window 380 discussed with respect to FIG. 3. Because of the lateral angle α in FIG. 6B, a right half of the cylindrical portion 650 of the known object 620 can appear larger in image 670 than it does in image 640. An image processing algorithm can detect the relative sizes of each half of the cylindrical portion 650 of the known object 620 by detecting left edge 632, center edge 636, and right edge 638 in a captured image, in addition or alternatively to determining distance D as described with reference to FIGS. 4A-4D and heading β as described with reference to FIGS. 5A-5D. A distance between a left edge 634 and a center edge 636 can define a left half of a cylindrical portion 650 of a known object 620. A distance between a center edge 636 and a right edge 638 can define a right half of a cylindrical portion 650 of a known object 620. The relative sizes of a right half and a left half of a cylindrical portion 650 of a known object 620 can be expressed as a ratio to determine the vehicle's lateral angle. For example, in image 640, a right half and a left half of cylindrical portion 650 can be closer in size than they appear in image 670, thus indicating that vehicle 610 in FIG. 6A has a smaller (or negligible, for example) lateral angle compared to the lateral angle α of the vehicle 610 shown in FIG. 6B. In order to determine an absolute lateral angle of vehicle 610 with respect to known object 620, an image processing algorithm can compare the locations of left edge 634, center edge 636, and right edge 638 in the captured image to the locations of the three edges in a calibration image, for example. In some examples, a calibration image can be used to determine a calibration lateral angle. The calibration lateral angle can be associated with an image captured when a vehicle 610 is parked in a desired location, such as in front of known object 620, for example. In some examples, the desired location can be proximate to an electric vehicle recharging station such that the vehicle can recharge automatically when it is parked in the desired location. The positions of the three edges of known object 620 in the captured image can be mapped to an absolute lateral angle (e.g. via a lookup table or other predetermined relationship between edge locations and lateral angle) to determine the lateral angle of vehicle 610 with respect to known object 620. The vehicle's lateral error can be a difference between a measured lateral angle and the calibration lateral angle.

Though exemplary determinations of vehicle position, heading and lateral offset have been described separately, above, it is understood that the examples of the disclosure can determine one or more of these quantities from a single captured image using one or more of the various processes described above. Further, while the examples are described in the context of horizontal heading and lateral offsets, the known object can be analogously modified to exhibit, vertically, the horizontal characteristics described in this disclosure—in this way, vertical determinations of heading and offset can be performed.

Figure 7:
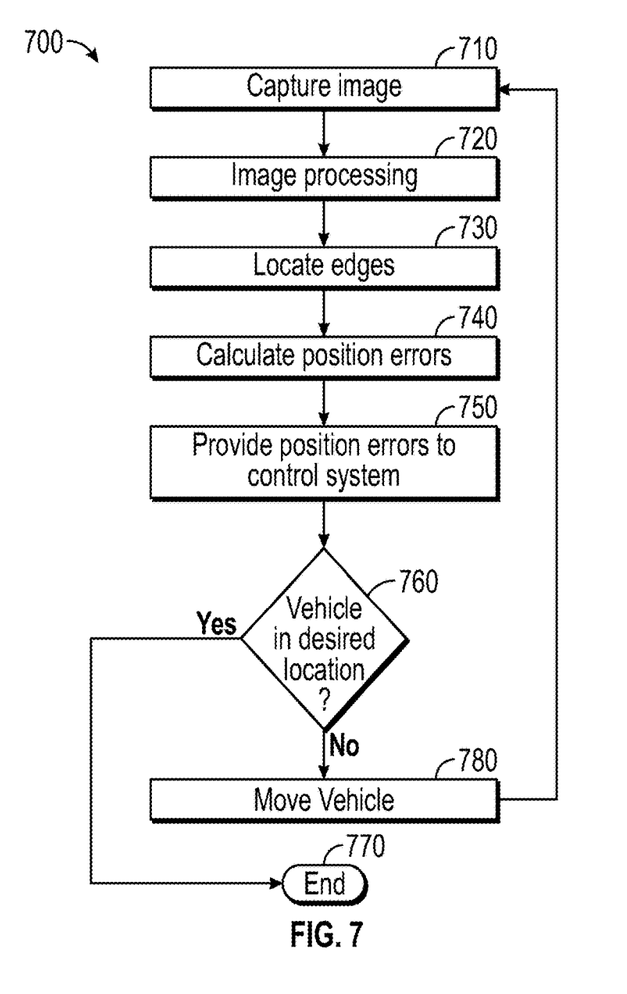
FIG. 7 illustrates a vehicle control process according to examples of the disclosure.

As described above, an onboard computer of a vehicle according to examples of the disclosure can use captured images of a known object and image processing to determine a vehicle's distance, heading angle, and/or lateral angle relative to a known object based on the location of a plurality of visual features (e.g., edges) of the object within the captured image. By determining a vehicle's location, position, and/or orientation with high accuracy, a vehicle controller can automatically maneuver a vehicle to park in a desired location. FIG. 7 illustrates a vehicle control process 700 according to examples of the disclosure. In the first step 710, an onboard camera can capture an image of a known object, such as any of the cropped windows and/or images shown in FIG. 3, 4C, 4D, 5C, 5D, 6C, or 6D, for example. In some examples, a known object may be an electric vehicle recharging station. In the next step 720, image processing algorithms can be performed according to examples of the disclosure described with reference to FIGS. 4-6. Image processing can be performed to identify a visual indicator associated with a known object, for example. In some examples, no separate visual indicator may be required, and instead, the image processing algorithm can identify the known object itself. Additionally or alternatively, at step 730, image processing can be performed to identify the left edge, center edge, and right edge of a cylindrical portion of the known object, as described with reference to FIGS. 4-6. The image processing algorithms can include determining a vertical projection as described above. In step 730, the three edge locations within the cropped window of the image captured at step 710 can be quantified (e.g., the locations of the three edges can be determined). In step 740, the locations of the edges can be used to determine a distance error, a heading error, and/or a lateral error of a vehicle as described above with reference to FIGS. 4-6, in accordance with examples of the disclosure. This step can include first determining the camera's distance, position, and/or orientation relative to the object to then determine the vehicle's distance, position, and/or orientation relative to the object, based on the camera's known distance, position, and/or orientation relative to the vehicle. In the next step 750, the distance error, heading error, and lateral error can be provided to a vehicle control system. Next at 760, the algorithm can determine if the errors are zero (or substantially zero, such as within a predefined error threshold), indicating that the vehicle is in a desired location. If the vehicle is in its desired location, the process is complete at 770. If not, the vehicle can move at 780 to reduce one or more errors and another image can be captured at 710 to start process 700 again. As an example, vehicle 410 as shown in FIG. 4B may move to a position shown by vehicle 410 in FIG. 4A to reduce distance error. As another example, vehicle 510 shown in FIG. 5B may move to a position shown by vehicle 510 in FIG. 5B to reduce heading error. As another example, vehicle 610 shown in FIG. 6B may move to a position shown by vehicle 610 in FIG. 6A to reduce lateral error. Process 700 can repeat until the vehicle is in its desired location. In some examples, a desired location can be proximate to an electric vehicle recharging station such that a vehicle can automatically begin charging when it is at the desired location.

Figure 8:
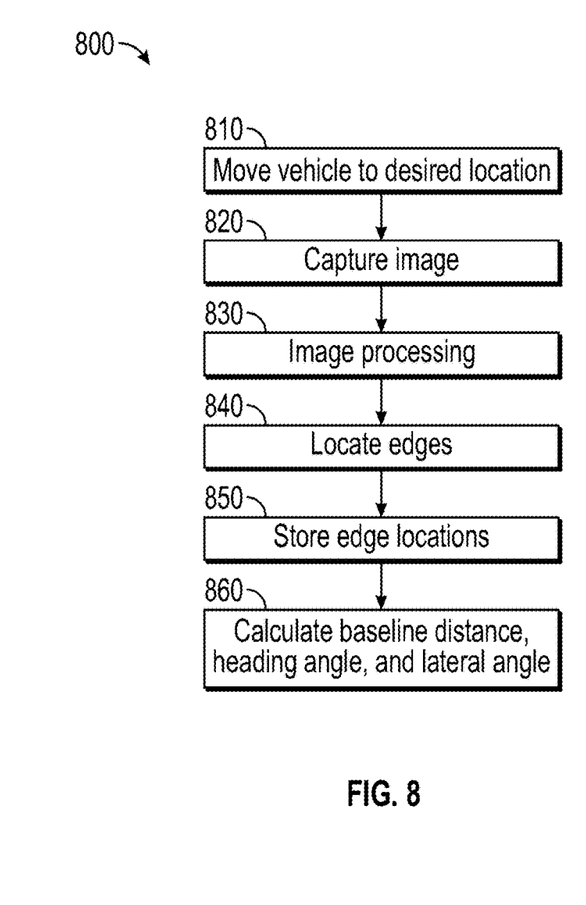
FIG. 8 illustrates a vehicle distance, position, and orientation calibration process according to examples of the disclosure.

In some examples of the disclosure, a calibration procedure can be used to provide a reference for determining distance error, heading error, and/or lateral error. FIG. 8 illustrates a vehicle position calibration process according to examples of the disclosure. In the first step 810, the vehicle can be positioned in a desired location relative to a known object. For example, vehicle 410 in FIG. 4A may be in a desired position relative to known object 420. Next at 820, an image of the known object, such as image 440 shown in FIG. 4C, can be captured using an onboard camera 412 while the vehicle 410 is positioned in the desired location, shown, for example, in FIG. 4A. In the next step 830, an image processing algorithm can be applied to the captured image 440. The image processing algorithm can include calculating a vertical projection. Next, the three edges of a cylindrical portion 430 of the known object 420 can be located 840 and stored 850. Optionally, the stored edge locations can be used to calculate baseline distance, heading angle, and/or lateral angle in step 860 using algorithms similar to those described with reference to FIGS. 4-6. Additionally or alternatively, the locations of the edges in the frame can be stored and used in baseline comparisons.

Figure 9:
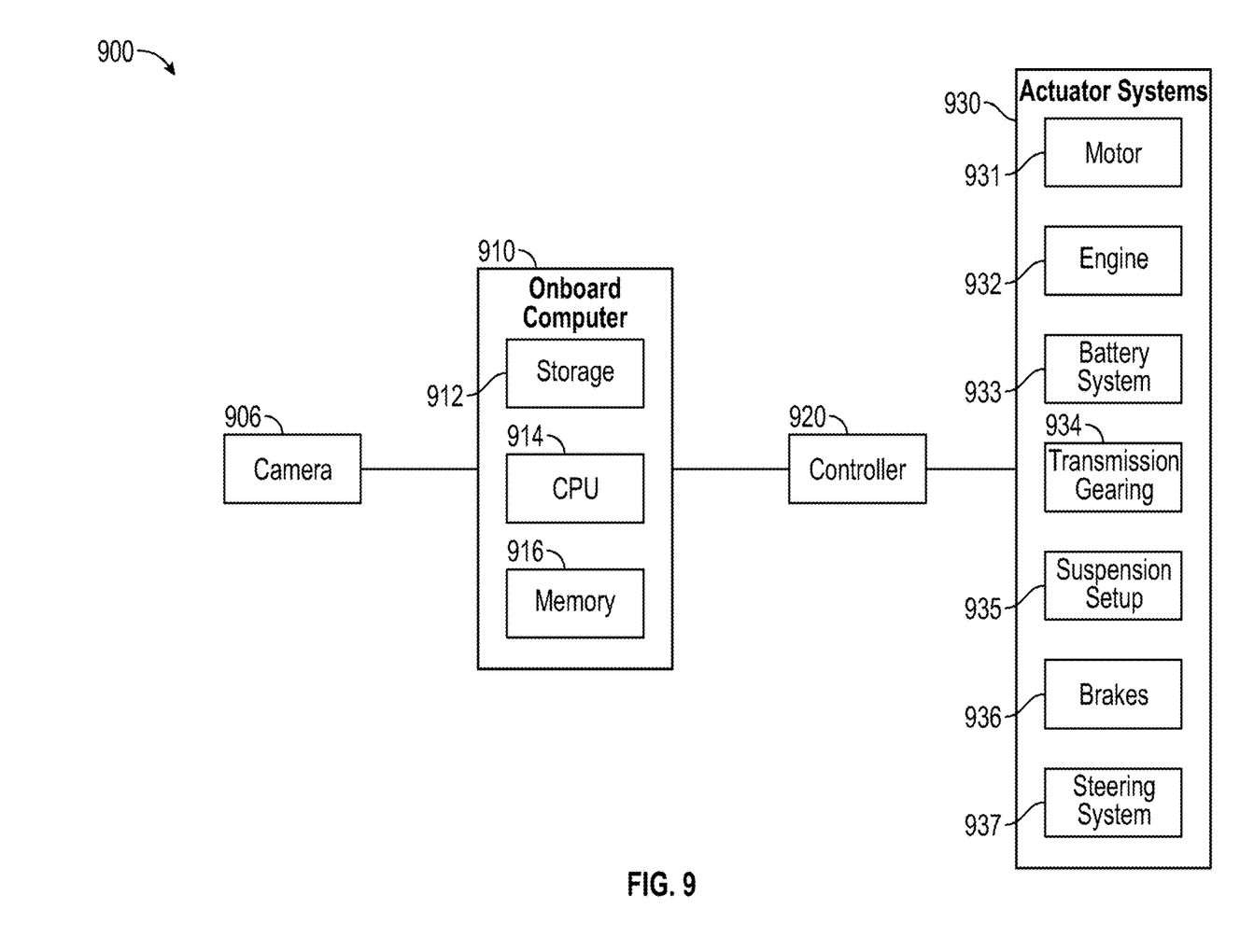
FIG. 9 illustrates a system block diagram according to examples of the disclosure.

FIG. 9 illustrates a system block diagram according to examples of the disclosure. Vehicle control system 900 can perform any of the methods described with reference to FIGS. 1-8. System 900 can be incorporated into a vehicle, such as a consumer automobile for example. Other example vehicles that may incorporate the system 900 include, without limitation, airplanes, boats, or industrial automobiles. Vehicle control system 900 can include a camera 906 capable of capturing an image. Vehicle control system 900 can include an on-board computer 910 coupled to the camera 906, and capable of receiving an image from the camera and determining one or more aspects of the vehicle's position relative to a known object in the image, as described above. On-board computer 910 can include storage 912, memory 916, and a processor 914. Processor 914 can perform any of the methods described with reference to FIGS. 1-8. Additionally, storage 912 and/or memory 916 can store data and instructions for performing any of the methods described with reference to FIGS. 1-8. Storage 912 and/or memory 916 can be any non-transitory computer readable storage medium, such as a solid-state drive or a hard disk drive, among other possibilities. The vehicle control system 900 can also include a controller 920 capable of moving the vehicle automatically based on the determinations of the on-board computer 910.

In some examples, the vehicle control system 900 can be connected (e.g., via controller 920) to one or more actuator systems 930 in the vehicle. The one or more actuator systems 930 can include, but are not limited to, a motor 931 or engine 932, battery system 933, transmission gearing 934, suspension setup 935, brakes 936, and steering system 937. Based on the determined vehicle position relative to the known object (e.g., charging station), the vehicle control system 900 can control one or more of these actuator systems 930 to direct the vehicle to move in an intended direction. This can be done by, for example, adjusting the steering angle and engaging the drivetrain (e.g., motor) to move the vehicle at a controlled speed. The camera system 906 can continue to capture images and send them to the vehicle control system 900 for analysis, as detailed in the examples above. The vehicle control system 900 can, in turn, continuously or periodically send commands to the one or more actuator systems 930 to control the movement of the vehicle. As the vehicle approaches a predetermined target area (e.g., a charging spot in front of a charging station), the vehicle control system 900 can control actuator systems 930, such as the brakes 936, to stop the vehicle when it is within a certain distance from the charging station. If the vehicle control system 900 determines, based on the images captured by the camera system 906, that the height of the vehicle requires adjustments to align a charging port on the vehicle with the charger, the vehicle control system 900 can further adjust the suspension setup 935, as detailed previously.

Therefore, according to the above, some examples of the disclosure are directed to a system comprising: a camera included in a vehicle, the camera configured to capture one or more images of an object, wherein the one or more captured images include the plurality of visual features of the object; a computing system operatively coupled to the camera, the computing system comprising: a processor configured to determine locations of the plurality of visual features within the one or more images; and a controller configured to move the vehicle to a particular location with respect to the object based on the determined location. Additionally or alternatively to one or more of the examples disclosed above, in some examples, the memory is further configured to store a position and an orientation of the camera with respect to the vehicle; and the processor is further configured to determine a location of the vehicle with respect to the object based on the position and orientation of the camera with respect to the vehicle. Additionally or alternatively to one or more of the examples disclosed above, the location of the camera with respect to the object comprises one or more of a distance of the camera from the object, a lateral angle of the camera with respect to the object, and a heading angle of the camera with respect to the object. Additionally or alternatively to one or more of the examples disclosed above, the camera's distance from the object is determined based on a first location of a first visual feature of the plurality of visual features within the one or more images of the object and a second location of a second visual feature of the plurality of visual features within the one or more images of the object. Additionally or alternatively the one or more examples disclosed above, the determining the camera's distance from the object further comprises: determining a distance between the first visual feature and the second visual feature in the one or more images; in accordance with a determination that the distance between the first visual feature and the second visual feature is a first distance, determining that the camera's distance from the object is a second distance; and in accordance with a determination that the distance between the first visual feature and the second visual feature is a third distance, different from the first distance, determining that the camera's distance from the object is a fourth distance, different from the second distance. Additionally or alternatively to one or more of the examples disclosed above, in some examples, the first distance is greater than the third distance and the second distance is less than the fourth distance. Additionally or alternatively to one or more of the examples disclosed above, in some examples, the camera's lateral angle with respect to the object is determined based on a first location of a first visual feature within the one or more images of the object, a second location of a second visual feature within the one or more images of the object, and a third location of a third visual feature within the one or more images of the object. Additionally or alternatively to one or more of the examples disclosed above, determining the camera's lateral angle with respect to the object further comprises: determining a first distance between the first visual feature and the second visual feature, determining a second distance between the first visual feature and the third visual feature, and determining a ratio of the first distance and the second distance; in accordance with a determination that the ratio is a first ratio, determining that the camera's lateral angle with respect to the object is a first lateral angle; and in accordance with a determination that the ratio is a second ratio, different from the first ratio, determining that the camera's lateral angle with respect to the object is a second lateral angle, different from the first lateral angle. Additionally or alternatively to one or more of the examples disclosed above, the camera's heading angle with respect to the object is determined based on a location of a first visual feature within the one or more images of the object. Additionally or alternatively to one or more of the examples disclosed above, in some examples, determining the camera's heading angle with respect to the object further comprises: in accordance with a determination that the location of the first visual feature is a first location, determining that the camera's heading angle with respect to the object is a first heading angle; and in accordance with a determination that the location of the first visual feature is a second location, different from the first location, determining that the camera's heading angle with respect to the object is a second heading angle, different from the first heading angle. Additionally or alternatively to one or more of the examples disclosed above, in some examples, the computing system further comprises a memory configured to store a baseline image corresponding to the particular location, and wherein the controller is configured to move the vehicle based at least on the baseline image and the one or more images captured by the camera. Additionally or alternatively to one or more of the examples disclosed above, in some examples, the computing system is further configured to identify the object based on one of the plurality of visual features. Additionally or alternatively to one or more of the examples disclosed above, in some examples, the processor is further configured to identify a first visual feature in the one or more images, and then select a portion of the one or more images to analyze to determine the locations of the plurality of visual features, wherein the portion of the one or more images is offset from the first visual feature by a predetermined amount. Additionally or alternatively to one or more of the examples disclosed above, in some examples, the plurality of visual features comprises a first edge between a first portion of the object and a second portion of the object, a second edge between two parts of the first portion, and a third edge, different from the first edge, between the first portion and the second portion. Additionally or alternatively to one or more of the examples disclosed above, in some examples, the object comprises a cylinder having a first part with a first visual characteristic and a second part, different from the first part, with a second visual characteristic, different from the first visual characteristic. Additionally or alternatively to one or more of the examples disclosed above, in some examples, the locations of the plurality of visual features within the one or more images are absolute locations. Additionally or alternatively to one or more of the examples disclosed above, in some examples, the particular location with respect to the object is pre-defined.

Some examples of the disclosure are related to a method of controlling a vehicle, comprising: capturing, with a camera included in the vehicle, one or more images of the an object having the a plurality of visual features, wherein the one or more captured images include the plurality of visual features of the object with a camera included in the vehicle; determining locations of the plurality of visual features within the one or more images; determining a location of the camera with respect to the object based on the one or more images captured by the camera determined locations of the plurality of visual features within the one or more images; and controlling movement of moving the vehicle to a particular location with respect to the object based on the determined location.

Some examples of the disclosure are related to a non-transitory computer-readable medium including instructions, which when executed by one or more processors, cause the one or more processors to perform a method comprising: capturing, with a camera included in the vehicle, one or more images of an object having a plurality of visual features, wherein the one or more captured images include the plurality of visual features of the object; determining locations of the plurality of visual features within the one or more images; determining a location of the camera with respect to the object based on the determined locations of the plurality of visual features within the one or more images; and moving the vehicle to a particular location with respect to the object based on the determined location.

Some examples of the disclosure are related to an electric vehicle recharging station, comprising: a first visual marker identifiable, by an image processing algorithm, in one or more images captured by an onboard camera of a vehicle; and a cylindrical portion including a right half defined by a first visual characteristic and a left half defined by a second visual characteristic, different from the first visual characteristic, wherein a plurality of boundaries of the cylindrical portion and a boundary between the left and right halves of the cylindrical portion are identifiable in the one or more images by the image processing algorithm to determine a location of the vehicle relative to the recharging station to automatically move the vehicle to a predefined charging location to begin charging automatically at the recharging station. Additionally or alternatively to one or more of the examples disclosed above, in some examples, the electric vehicle recharging station includes a vertical plane situated behind the cylindrical portion and the first visual marker. Additionally or alternatively to one or more of the examples disclosed above, in some examples, the vertical plane has a right half defined by the second visual characteristic and a left half defined by the first visual characteristic.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method of moving a vehicle to a target location, the method comprising:
    capturing, with a camera of the vehicle, one or more images of an object having a plurality of visual features;
    performing, by a processor of the vehicle, image processing on the one or more images to identify one or more visual indicators associated with the object;
    determining, by the processor, a distance error, heading error, and lateral error using the one or more visual indicators;
    providing, by the processor, the distance error, heading error, and lateral error to a vehicle control system of the vehicle; and
    automatically moving, by the vehicle control system, the vehicle to reduce one or more of the distance error, heading error, and lateral error if at least one of the distance error, heading error, and lateral error is outside of a predefined error threshold.

2. The method of claim 1, wherein the object comprises a cylindrical portion.

3. The method of claim 2, wherein performing image processing on the one or more images further comprises identifying visual indicators comprising a left edge, center edge, and right edge of the cylindrical portion.

4. The method of claim 3, wherein identifying a left edge, center edge, and right edge of the cylindrical portion further comprises determining where the left edge and the right edge of the cylindrical portion fall within each of the one or more images.

5. The method of claim 4, wherein identifying a left edge, center edge, and right edge of the cylindrical portion further comprises determining where the center edge of the cylindrical portion is located within each of the one or more images.

6. The method of claim 5, further comprising determining a distance at which the vehicle located with respect to the object by mapping an amount by which a size of the cylindrical portion in one of the images differs from a calibration size.

7. The method of claim 4, wherein performing image processing on the one or more images further comprises detecting a relative location of the center edge within one of the images to determine a vehicle heading angle.

8. The method of claim 4, wherein performing image processing on the one or more images further comprises comparing a position of the center edge in at least one of the images to a calibration position of the center edge.

9. The method of claim 8, further comprises determining a heading angle of the vehicle with respect to the object by mapping an amount by which the position of the center edge differs from the calibration position to an absolute heading angle.

10. The method of claim 4, further comprises detecting a relative sizes of each half of the cylindrical portion of the object.

11. The method of claim 10, further comprises determining a lateral angle of the vehicle from a ration of the relative sizes of the each half of the cylindrical portion of the object.

12. The method of claim 10, further comprises determining a lateral angle of the vehicle by mapping the positions of the left edge, right edge, and center edge to an absolute lateral angle.

13. The method of claim 12, further comprises capturing the absolute lateral angle when the vehicle is in the target location.

14. A vehicle position calibration method comprising:
    positioning a vehicle in a desired location by a vehicle control system of the vehicle;
    capturing an image of an object using a camera of the vehicle;
    performing imaging processing on the captured image using a processor of the vehicle;
    locating by the processor, a left edge, a center edge, and a right edge of a portion of the object;
    storing in a memory of the vehicle, locations of the left edge, center edge, and right edge; and
    calculating one or more of a baseline distance, heading angle, and lateral angle using the stored locations of the left edge, center edge, and right edge.

15. The vehicle position calibration method, wherein performing imaging processing on the captured image comprises calculating a vertical projection.

16. The vehicle position calibration method of claim 14, wherein the portion of the object is cylindrical.

* * * * *